April 16, 1935.　　　　K. R. SHAW　　　　1,998,391

CABLE END STRIPPING MACHINE

Filed Feb. 1, 1933　　　2 Sheets-Sheet 1

INVENTOR:
Kenneth R. Shaw,
BY
his ATTORNEY

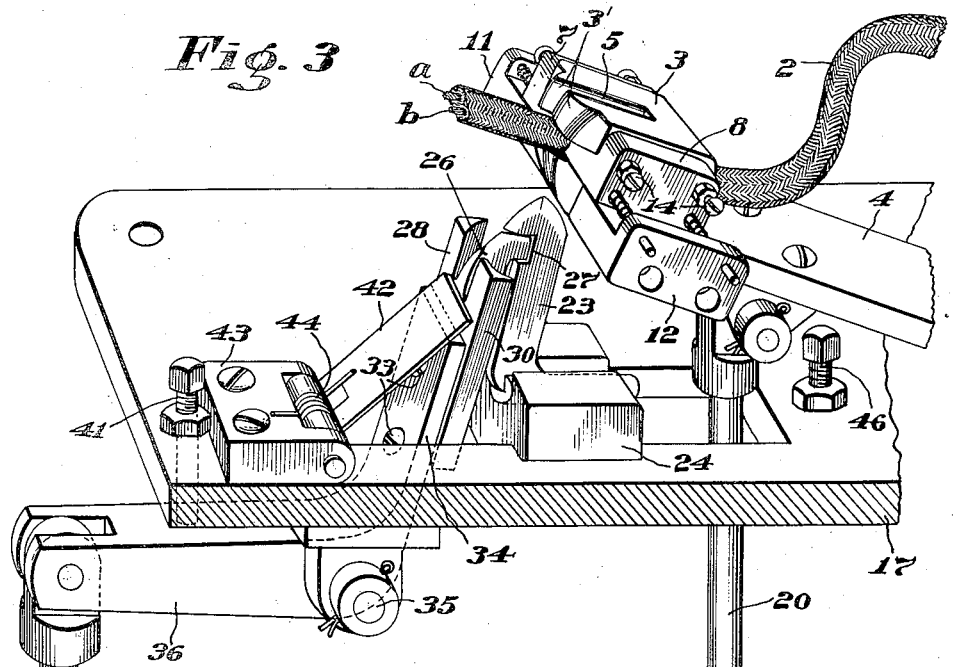

Patented Apr. 16, 1935

1,998,391

UNITED STATES PATENT OFFICE 1,998,391

CABLE END STRIPPING MACHINE

Kenneth R. Shaw, Easthampton, Mass., assignor to United Elastic Corporation, Easthampton, Mass., a corporation of Massachusetts Application February 1, 1933, Serial No. 654,664

14 Claims. (Cl. 81—9.51)

In order to attach the wires of an insulated conductor or cable to the terminals of a plug, connector, or other fixture or fitting, it is necessary first to strip the insulation from the wires. If any substantial number of such connections are to be made this matter of removing the insulation from the wires becomes a tedious operation and one which involves the expenditure of considerable time and labor.

The present invention is particularly concerned with this problem and aims to devise a machine with the aid of which this stripping operation can be performed rapidly and efficiently.

The nature of the invention will be readily understood from the following description when read in connection with the accompanying drawings, and the novel features will be particularly pointed out in the appended claims.

In the drawings,

Fig. 3 is a perspective view of the parts shown in Fig. 2;

Fig. 4 is an end view of the parts shown in Fig. 3;

Fig. 5 is a vertical, sectional view through the holder and certain of the adjacent parts; and Fig. 6 is a plan view of the holder and certain parts associated therewith.

Figure 1:
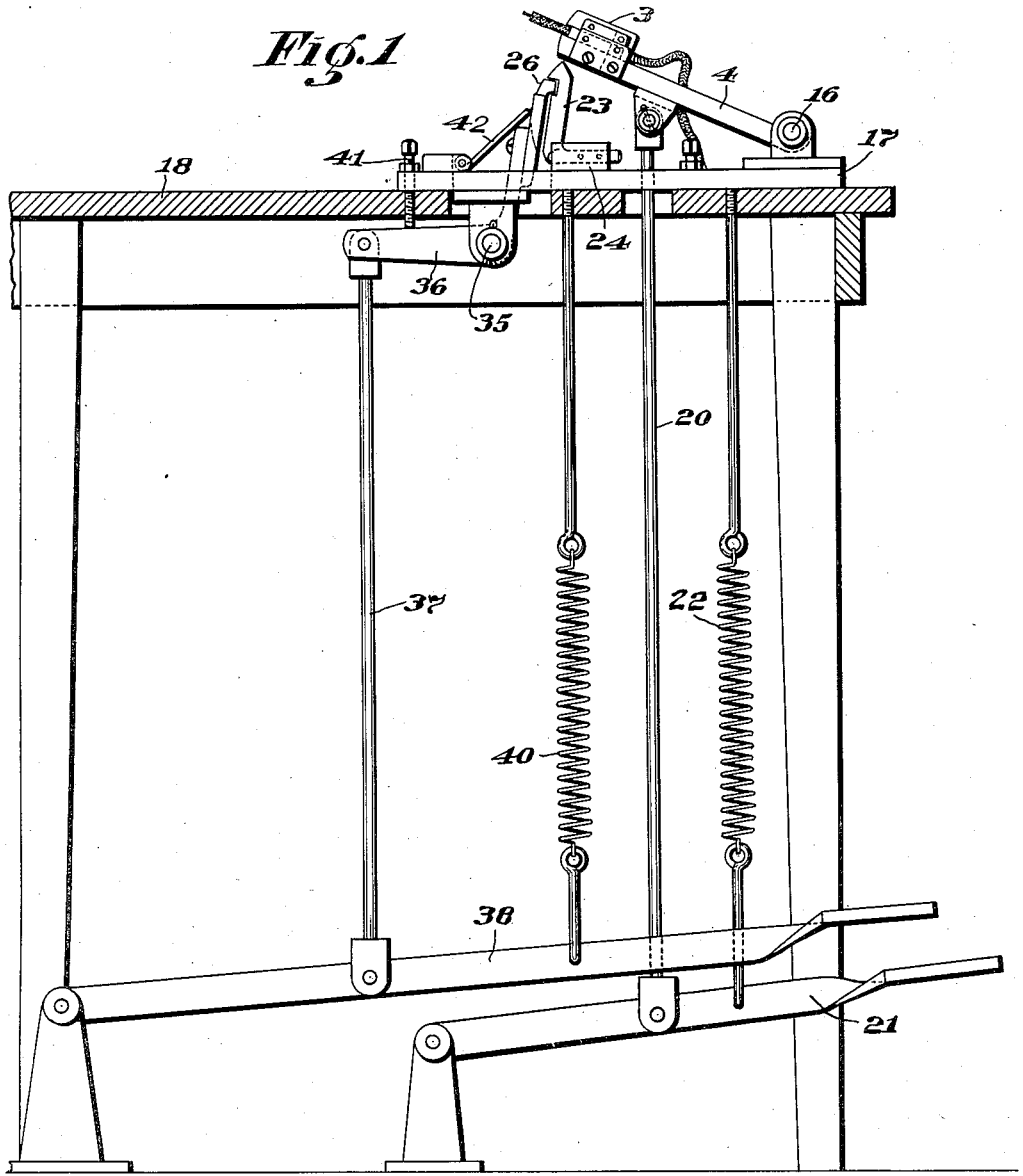
Figure 1 is a side elevation, partly in section, of a machine constructed in accordance with this invention.

Referring first to Figs. 3 to 6, inclusive, the mechanism there shown comprises a holder for the end portion of a cable 2, a typical form of which comprises two twisted wires $a$ and $b$ each individually covered with insulation such as asbestos, or other suitable material, with an outer jacket braided around both conductors and their insulating coverings. The details of construction of these cables vary substantially. Frequently the insulated wires are run through a bath of some adhesive, such as a rubber compound of some nature, either before or after the outer jacket has been braided around them, thus making the stripping operation more difficult. Usually this operation involves the removal of all of the outside elements from the end portion of the cable for a distance of, say, one and a half or two inches.

The holder includes a body 3, preferably integral with a supporting arm 4, the forward end of the body having both vertical and horizontal slots 5 and 6, respectively, formed therethrough. Mounted in the horizontal slot 6 are two slides 7 and 8, both grooved on their adjacent edges to receive and grip the cable, as best shown in Fig. 4. Coiled springs 10 interposed between these slides and side pieces 11 and 12 which are screwed to the opposite sides of the body 3, press the slides 7 and 8 yieldingly toward each other, the movements of these slides so produced being limited by stop screws 13 and 14. A hole 15 is formed through the body 3 in line with the grooves in the slides 7 and 8 so that the operator can readily slip the end of the cable through this hole and said grooves until the desired length projects beyond the forward end of the holder.

The rearward end of the holder arm 4 is pivoted at 16, Fig. 1, on a machine bed 17 which is secured on the top 18 of a suitable table or frame, and it is connected by an upright rod 20 with a foot treadle 21. A coiled spring 22, which also is connected to this treadle, serves normally to maintain the holder 3 in a raised position, as indicated in Figs. 1 and 3.

Mounted immediately below the position normally occupied by the holder and in line with the slot 5 is a stationary knife 23 having a pointed double edged upper end shaped something like the point of a sword. The base of this knife is secured rigidly in a block 24 by means of screws 25, this block, in turn, being fastened securely in the base plate 17 of the machine. At its forward edge the knife 23 is partly cut away to receive a stripper blade 26 which preferably is provided at its upper end with a short extension that normally lies in a notch 27 in the knife 23. Lying at opposite sides of the blade 26 are two members 28 and 30 which are so shaped as to cooperate with the blade to form two sharp edged V-shaped notches 31 and 32, as best shown in Fig. 4. Preferably the parts 26, 28 and 30 are all made in one piece.

For the purpose of operatively supporting the stripper blade it is removably secured by means of screws 33, Fig. 3, to the arm 34 of a bell crank lever, fulcrumed at 35, and including a horizontal arm 36 which is connected by an upright rod 37 with a second foot treadle 38, Fig. 1. A coiled spring 40 acts through this treadle and the connections just described to hold the stripper blade normally in a position immediately beside the knife 23, as shown in Figs. 1 and 3. A stop screw or bolt 41 cooperates with the lever arm 36 to permit the accurate adjustment of this position.

Located immediately in front of the stripper blade is a plate 42 which is pivotally secured to a block 43 and which normally is held against the blade by means of a coiled spring 44, Fig. 3.

In using the machine the end portion of the cable is inserted in the holder in the manner above described, and approximately as indicated in Figs. 1, 3, and 4. The operator then steps on the treadle 21, thus swinging the holder 3 downwardly far enough to force the knife 23 completely through the cable and between the wires a and b, Fig. 4. This results in making a cut through the insulation which splits the cable lengthwise. Simultaneously with this operation the stripper blade 26 enters the cut so formed in the cable. In fact, the upper edge of this blade may be, and usually is, so sharpened as to assist in this operation, the sharpened part extending downwardly to a point adjacent to the bottom of the notches 31 and 32. The edges of these notches while not sharpened as they would be for cutting purposes, are, nevertheless, sharp enough to cut into the insulation, and the downward movement of the holder 3 forces the portions of the cable at opposite sides of the split formed in it down firmly into the notches, causing them to bite into it and to grip the cable securely. This action is facilitated by the fact that the holder is provided with projecting end portions 3', Figs. 3 and 6, which overlie the opposite sides of the cable where it emerges from the holder and back it up, these extensions being shaped to fit loosely into the spaces between the stripper blade 26 and the members 28 and 30 at opposite sides of it. An adjustable stop screw 46, Fig. 3, engages the arm 4 and limits the downward movement of the holder.

Immediately after this movement has been completed the operator steps on the other treadle 38, which operates through its connections with the stripper blade 26 to move this blade and its companion parts 28 and 30 between which the cable is gripped, in a forward direction or toward the left, Fig. 3, where they exert an endwise pull on the insulation. This pull, being directed lengthwise of the wires, serves to strip the entire insulating covering off the end portions of the wires. The chief resistance to this operation normally is offered by the braided jacket and this has been cut by the knife 23 and blade 26 so that it can easily be pulled apart. During this operation the blade 23 still remains in the cut or slit formed through the cable and it acts as a stop to effectually resist the pull exerted by the stripper on the main part of the cable. In other words, it holds the part of the cable behind the cut against the pull of the stripper.

Figure 2:
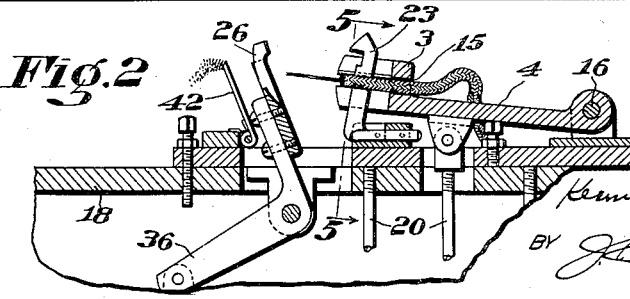
Fig. 2 is a sectional view of the more important parts of the machine shown in Fig. 1.

As the stripper is swung forwardly toward the left, Figs. 1, 2 and 3, the plate 42 slides up along the outer face of the stripper and forces the insulation upwardly out of the notches or jaws 31 and 32, this plate thus performing the functions of a clearer. The final position of the stripper and the clearer 42 are illustrated in Fig. 2.

As soon as these operations have been completed the workman releases the treadles 21 and 38 which are automatically returned by the springs to their normal or upper positions, these movements serving also to return the parts at the head of the machine to their original relationship as shown in Figs. 1 and 3. The workman next withdraws the stripped end of the cable from the holder and repeats the operations above described.

I have demonstrated in actual use that this machine will perform the end stripping operation rapidly and efficiently, and that it effects a very substantial saving in the labor required to do this work.

While I have herein shown and described a preferred embodiment of my invention, it will be evident that the invention may be embodied in other forms without departing from the spirit or scope thereof. For example, in this machine the cutting operation is performed chiefly by the knife 23 but partly also by the blade 26, the former piercing the insulation in advance of the latter. The two members thus cooperate in performing the cutting operation. As these two members are moved away from each other they perform additional and very important functions, the blade 26 acting as a stripper and the knife 23 as a stop to resist the pull exerted on the cable by the stripper. It will be evident, however, that these functions could be performed by a variety of other arrangements in which they either could be made to cooperate in cutting the cable or not, as desired.

The particular cable illustrated in the drawings is of the type commonly used for conducting current to various electrically operated domestic appliances such as vacuum cleaners, flat irons, toasters, and the like. The machine shown can, however, be adapted for operation on a considerable variety of cables for conducting electricity.

Having thus described my invention, what I desire to claim as new is:

1. In a cable end stripping machine, the combination of two members for piercing completely through the insulation of the cable between the wires thereof and behind the end of the cable, and mechanism for relatively moving said members apart in a direction lengthwise of the cable to strip from the wires the portion of the insulation between the end of the cable and the point at which it was pierced.

2. In a cable end stripping machine, the combination of a holder for the end portion of a cable, means for cutting the insulation on said end portion, mechanism operable to exert an endwise pull on the insulation on said end portion to strip it from the wires, and a member for piercing the cable and holding the part of the cable behind said end portion against the pull so exerted.

3. In a cable end stripping machine, the combination of a holder for the end portion of a cable, means for cutting the insulation on said end portion, mechanism for relatively moving said holder and said cutting means into and out of position for the cutting means to act on the cable, means for gripping the insulation of said end portion and pulling it endwise to strip it from the wires, and a device for piercing said cable behind the point at which the insulation is gripped to hold the main body of the cable against the pull so exerted.

4. In a cable end stripping machine, the combination of a holder for the end portion of a cable, a knife for splitting said portion of the cable longitudinally, mechanism for relatively moving said holder and said knife to cause the knife to split the cable, a member associated with said knife to enter the split so formed in the cable, and mechanism for relatively moving said knife and said member in a direction lengthwise of the cable to strip the insulation from the end portion of the cable.

5. In a cable end stripping machine, the combination of a holder for the end portion of a cable, a knife for splitting said portion of the cable longitudinally, mechanism for relatively moving said holder and said knife to cause the knife to split the cable, a member associated with said knife to enter the split so formed in the cable, a device associated with said member for gripping the insulation, and mechanism for moving said member and said device endwise of the cable to strip the insulation from the wires.

6. A machine according to preceding claim 5 in which means is provided for automatically removing from said device the insulation so stripped from the wires.

7. In a cable end stripping machine, the combination of a holder for the end portion of a cable, means supporting said holder for swinging movement, a relatively stationary knife for splitting the cable longitudinally, mechanism for swinging said holder to force the knife through the insulation on the cable, a stripper blade associated with said knife to enter the cut made in the cable by the knife, and mechanism operable to force said blade endwise to strip the insulation from the end portion of the cable to leave the wires substantially bare.

8. In a cable end stripping machine, the combination of a holder for the end portion of a cable, means supporting said holder for swinging movement, a relatively stationary knife for splitting the cable longitudinally, mechanism for swinging said holder to force the knife through the insulation on the cable, a stripper blade associated with said knife to enter the cut made in the cable by the knife, a device associated with said blade for gripping the insulation on the end portion of the cable, and mechanism operable to move said blade and said device toward the end of the cable to pull the insulation off said portion of the cable while said knife remains in the cut which it formed in the cable and serves to resist the pull on the cable of said blade and said device.

9. In a cable end stripping machine, the combination of a holder for the end portion of a cable, means supporting said holder for swinging movement, a relatively stationary knife for splitting the cable longitudinally, mechanism for swinging said holder to force the knife through the insulation on the cable, a stripper blade associated with said knife, means for normally holding said blade immediately beside said knife where it will be forced through the insulation with the knife, V-shaped gripping jaws associated with said blade and into which the insulation at the end portion of the cable is forced by the movement of said holder, and mechanism for moving said blade and said jaws toward the end of the cable to strip the insulation from the end portion of the cable while the knife holds the main part of the cable against the pull exerted by the blade and said jaws.

10. In a cable end stripping machine, the combination of a holder for the end portion of a cable, means supporting said holder for swinging movement, a relatively stationary knife for splitting the cable longitudinally, mechanism for swinging said holder to force said knife through the insulation on the cable, a stripper blade associated with said knife, means for normally holding said blade immediately beside said knife where it will be forced through the insulation with the knife, V-shaped gripping jaws associated with said blade and into which the insulation at the end portion of the cable is forced by the movement of said holder, mechanism for moving said blade and said jaws toward the end of the cable to strip the insulation from the end portion of the cable, and a cleaner so associated with said jaws as to utilize the operative movement of them to remove from them the insulation so stripped from the cable.

11. In a cable end stripping machine, the combination of means for splitting the insulation of a cable longitudinally at a point adjacent to its end, means for pulling longitudinally in opposite directions on the opposite end walls of the longitudinal split so formed in the insulation to strip the end portion thereof from the wires, and means for holding the main body of the cable against the pull so exerted.

12. In a cable end stripping machine, the combination of means for splitting the insulation of the cable longitudinally between the wires thereof and at a point adjacent to but spaced from the end of the cable, and means for pulling longitudinally in opposite directions on the opposite end walls of the longitudinal cut so formed in the insulation to strip the end portion thereof from the wires.

13. In a cable end stripping machine, the combination of means for splitting the insulation of a cable between the wires thereof and at a point adjacent to but spaced from the end of the cable, and additional means for pulling in an endwise direction on the split section of insulation to strip it from the wires, said splitting means including a device for entering the split made in the cable by said splitting means and serving to hold the main body of the cable against the pull exerted by said additional means.

14. In a cable end stripping machine, the combination of means for splitting the insulation of a cable longitudinally between the wires thereof and at a point adjacent to but spaced from the end of the cable, said means including members separable in a direction lengthwise of the cable, and mechanism operable to force said members apart in said direction.

KENNETH R. SHAW.